United States Patent [19]

Nason et al.

[11] Patent Number: 4,790,127
[45] Date of Patent: Dec. 13, 1988

[54] BERRY HARVESTER

[76] Inventors: Elton N. Nason; Laurence R. Grant, both c/o Agreco, Inc., P.O. Box 100, Millbridge, Me. 04658

[21] Appl. No.: 28,171

[22] Filed: Mar. 19, 1987

[51] Int. Cl.$^4$ .................... A01D 46/00; A01D 46/20
[52] U.S. Cl. .............................. 56/330; 56/DIG. 15
[58] Field of Search .................. 56/330, 331, 328 R, 56/130, 116, DIG. 15

[56] References Cited

U.S. PATENT DOCUMENTS

| | | | |
|---|---|---|---|
| 1,907,467 | 5/1933 | Tervo et al. | 56/328.1 |
| 3,563,016 | 2/1971 | Tolochko et al. | 56/331 |
| 3,736,738 | 6/1973 | Carr | 56/330 |
| 4,009,555 | 3/1977 | Temple | 56/DIG. 15 |
| 4,193,250 | 3/1980 | Kessens et al. | 56/DIG. 15 |
| 4,211,062 | 7/1980 | Sarig et al. | 56/328.1 |
| 4,229,931 | 10/1980 | Schlueter et al. | 56/DIG. 15 |
| 4,409,778 | 10/1983 | McNaught | 56/DIG. 15 |
| 4,578,937 | 4/1986 | West et al. | 56/330 |
| 4,697,404 | 10/1987 | Brockmeier et al. | 56/6 |

Primary Examiner—Paul J. Hirsch
Assistant Examiner—Vincent Ciamacco
Attorney, Agent, or Firm—W. G. Fasse; D. H. Kane, Jr.

[57] ABSTRACT

A berry picker, especially for blueberries, is equipped with a plurality of picking units forming at least one row of picking units in a picking head movably carried by a mobile support chassis. Each picking unit has its own picking conveyor carrying a plurality of picking combs. Each picking conveyor is supported by its own picking frame. All the picking frames are carried by a mounting frame or carriage floatingly mounted on the mobile support chassis. Each picking frame is movably supported by the floating mounting frame or carriage for automatically lifting each picking frame individually by a respective first power lifter in response to an obstacle signal representing the ground condition. The ground condition signal is sensed by a ground sensor provided individually for each picking unit. The floating movement of the mounting frame is accomplished by separate second power lifters in response to further sensors or in response to a manual operator control. By staggering and overlapping the picking units of one row with the picking units of another row, strips of unpicked areas are avoided.

20 Claims, 7 Drawing Sheets

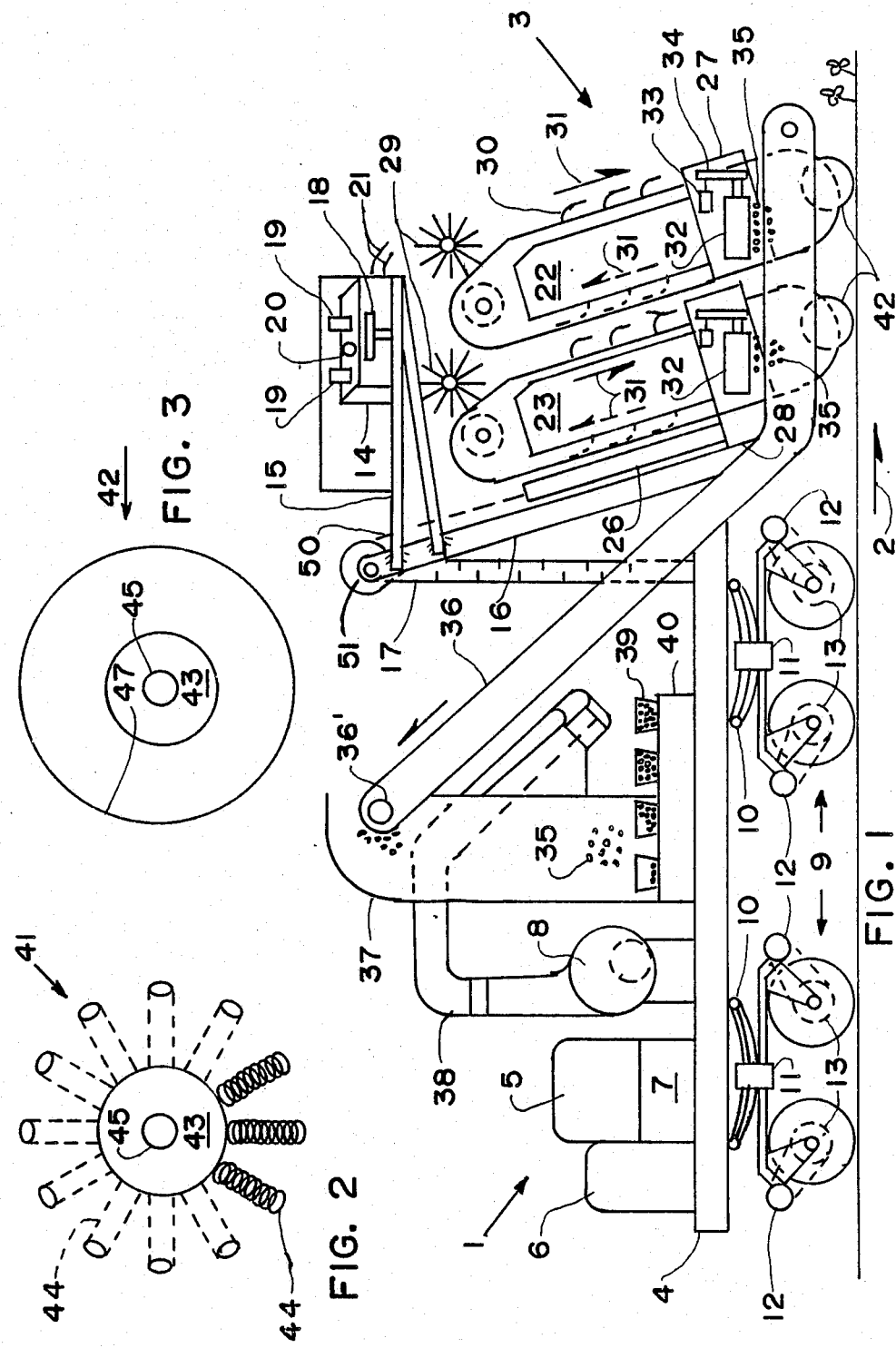

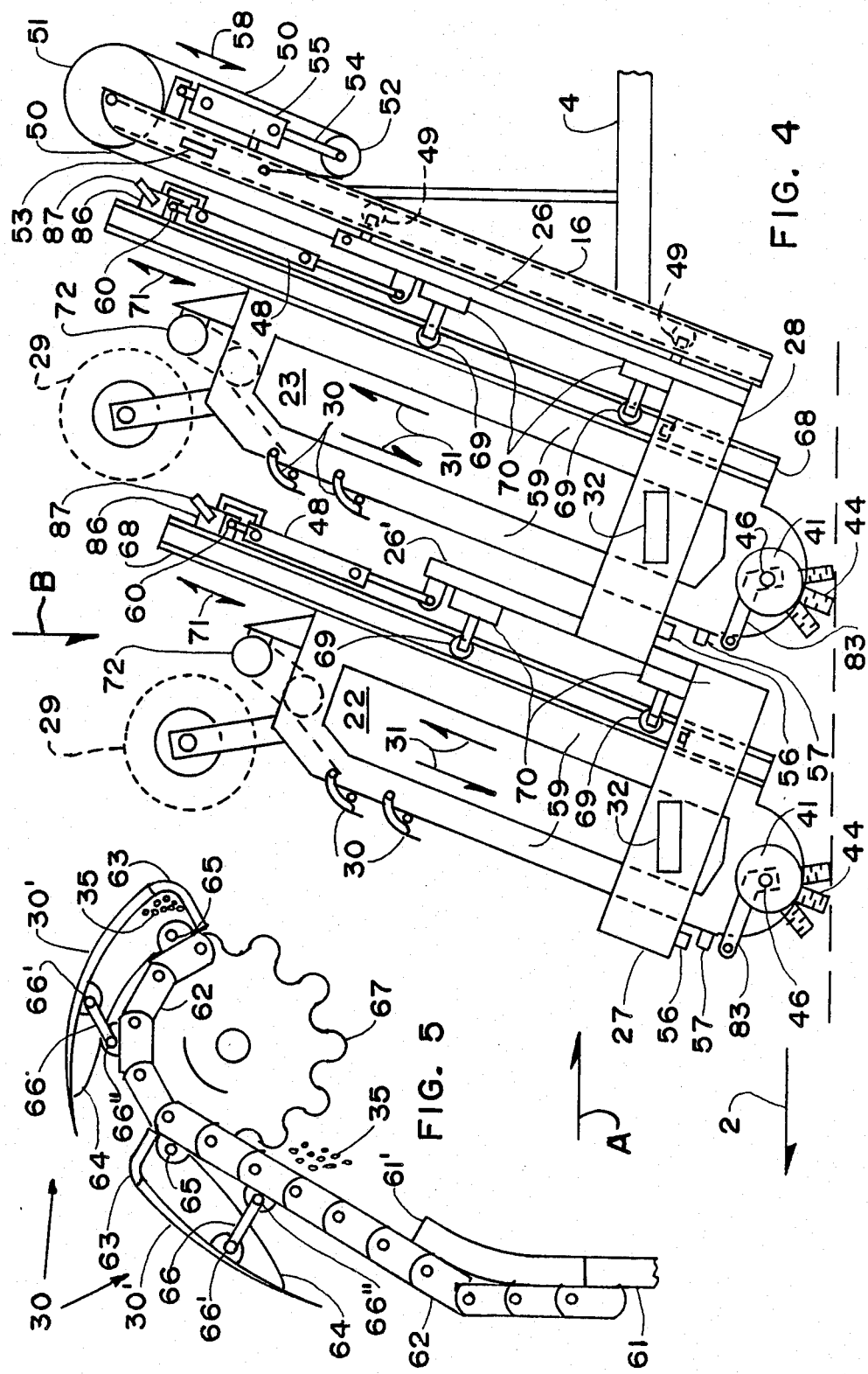

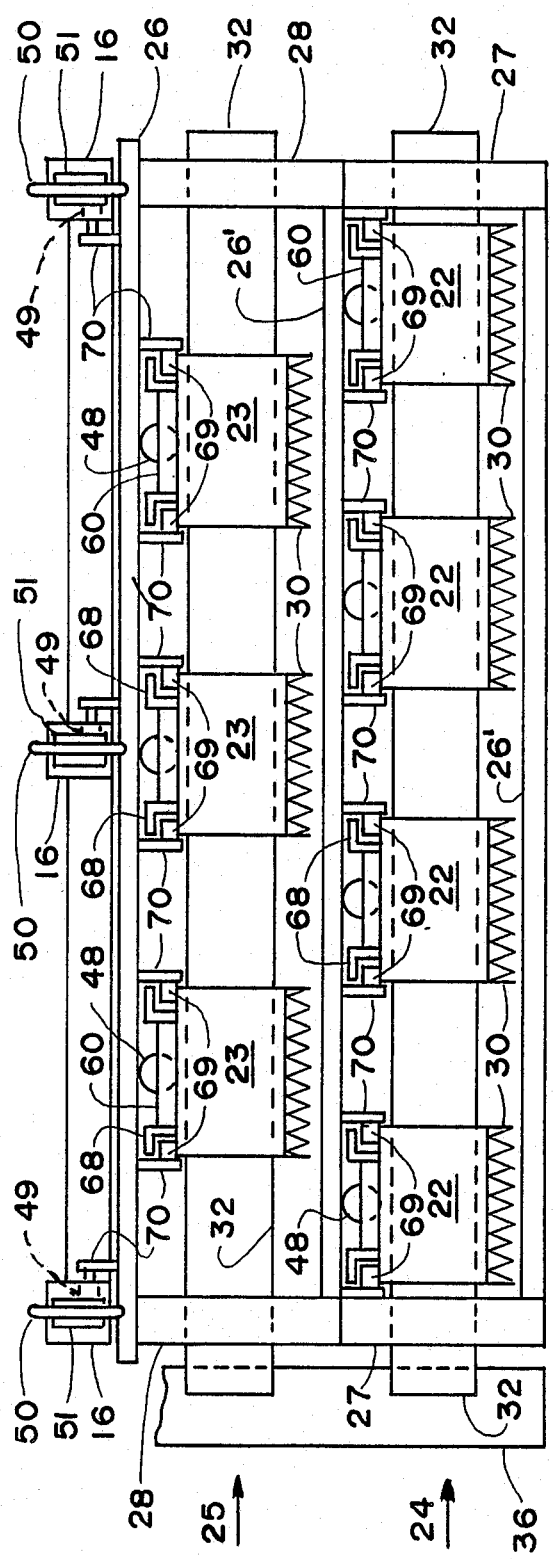

BERRY HARVESTER

FIELD OF THE INVENTION

The invention relates to a berry harvester for picking berries, especially blueberries.

DESCRIPTION OF THE PRIOR ART

Harvesting machines, including berry pickers are known in the art. U.S. Pat. No. 1,193,189 (Richter) issued Aug. 1, 1916 discloses a potatoe picker. A rotating hollow drum or cylinder carries a plurality of rake teeth for picking potatoes to be dropped into a chute passing longitudinally through the hollow drum and leading laterally out of the drum. The chute may be vibrated to facilitate the transport of the potatoes onto a conveyor which extends along one side of the apparatus and in the travel direction. Richter's potatoe picker is suitable only for operation on cultivated fields on which ground obstacles do not pose a problem.

U.S. Pat. No. 1,354,283 (Clapp) issued Sept. 28, 1920 discloses a cranberry picker in which picking fingers perform a rocking movement and cranberry collecting scoops travel, driven by chains, in a direction opposite to the pointing direction of the fingers for collecting the berries from the fingers. The frame which carries the rocking fingers and the travelling scoops is adjustable into several fixed positions to determine the clearance between the ground on which the picker travels and the picking fingers. The picking fingers are not capable of automatically responding to obstacles on the ground.

U.S. Pat. No. 1,371,306 (Hayden), issued Mar. 15, 1921, discloses a cranberry harvester in which again berry stripping scoops cooperate with picker units for gathering the berries from the scoops. The picker units travel in the same direction as the stripping scoops. Therefore, the spillage of picked berries must be substantial. A manually operable linkage system including toggle links enables the operator to raise the picking components to clear obstructions on the ground. An automatic response to obstacles on the ground is not disclosed in the Hayden cranberry picker.

U.S. Pat. No. 1,622,117 (Jenkins) granted Mar. 22, 1927 discloses a berry picker quite similar to that of U.S. Pat. No. 1,193,189 (Richter). In Jenkins a berry picking drum carries berry picking tines which are supposed to collect the berries onto a chute which is stationary inside the drum for lateral discharge of the berries. The picking unit is secured to one end of a frame, the other end of which is handled by an operator. The frame is secured to the axle of a pair of support wheels for permitting a see-saw type of movement. In other words, the operator can raise or lower the picking unit to the extent permitted by a position adjustable ground engaging wheel secured to the forward end of the see-saw frame. An automatic response to ground obstacles for the raising and lowering of the picking unit is not possible in the Jenkins picker.

U.S. Pat. No. 2,220,398 (Dreikosen) issued on Nov. 5, 1940 and describes a potatoe picking machine also suitable for picking smaller rocks off the ground. The picking tines are secured to endless chains rotating about three sprockets arranged to form a triangle with a discharge conveyor inside the triangle. The individual tines are spring biased to yield to relatively small obstacles on the ground. The picking unit and thus the position of the picking tines relative to the ground can be adjusted manually by raising or lowering the picking unit relative to a fixed guide slot and tightening a nut on a bolt when the picking unit has been brought into the desired position. Additionally, the operator may use a manual operating lever for raising or lowering the picking unit into several fixed positions determined by notches on a rack. These features do not provide any suggestion toward an automatic response to obstacles on the ground.

U.S. Pat. No. 2,267,879 (Tillitt) was issued on Dec. 30, 1941 and discloses a sugar beet collector and loader which utilizes the basic features of the Richter potatoe picker described above adapted for sugar beet collecting. Additionally, Tillet uses three driven conveyors. One conveyor passes centrally through the collecting drum. The second conveyor is arranged at right angles to the conveyor which brings the beets out of the collecting drum. The third conveyor in turn is arranged at right angles for transporting the beets onto a vehicle. Tillet does not provide for any automatic response to obstacles on the ground. U.S. Pat. No. 2,795,099 (Getsinger) was issued on June 11, 1957 and discloses a cranberry harvesting machine in which the picking tines are caused to withdraw into the picking drum for transferring any picked berries onto a conveyor located outside of the drum. The Gestinger apparatus is suitable only for use on cultivated fields because no obstacle sensing is disclosed.

U.S. Pat. No. 3,460,332 (Buchele et al) was issued on Aug. 12, 1969 for a strawberry picker. The picking tines are driven by two chains travelling on a chain guide track which simultaneously forms a cam track for operating the picking tines into different positions depending on the particular location of the tines along the track for gathering berries at the bottom portion and for discharging berries further up the cam track. The entire picking unit may be pivoted manually by the operator into a ground engaging position or into a lifted position. A cage formed of several ground engaging sledge runners keeps the picking tines in a defined position relative to the ground, to prevent the fingers from digging into the ground. However, pivoting of the entire chain assembly must be accomplished with a manual control lever.

U.S. Pat. No. 3,552,108 (Kattan et al) was issued on Jan. 5, 1971 for a berry harvesting machine. The harvesting of strawberries is accomplished by the cooperation of air suction with lifting brushes and picking combs. For this purpose the air flow brushes and picking combs are driven by an endless conveyor inside a suction pipe which is supposed to lift the plants and to keep any picked berries on the picking combs. A picking frame and a chassis are pivotally carried by a trailer type axle. A piston cylinder device manually controlled by an operator enables the operator to closely control the elevation of the lower end of the suction pipe above the ground. However, the piston cylinder device is not responsive to any sensing of obstacles on the ground.

U.S. Pat. No. 3,616,630 (Gray et al) was granted on Nov. 2, 1971 for an apparatus for harvesting fruit from low plants, primarily blueberries.

Gray et al also employ the basic teaching of Richter in that the picking tines are secured to a rotating drum in which a conveyor is arranged for the lateral removal of he picked berries. The picking drum is supported in a frame which in turn is pivotally mounted for adjustment of the downward reach of the picking tines with the aid of a hydraulic piston cylinder arrangement which is actuated by a hydraulic pump operable by the operator. With this hydraulic pump the operator is able to adjust the level of the frame carrying the picking drum in such a way that the free ends of the picking tines are one or two inches above the ground at their lowermost point. However, any response to obstacles on the ground is not possible unless the operator sees a larger obstacle, such as a rock and tries to lift the picking unit in time. However, the operator would have to lift the entire picking unit, thereby leaving substantial areas unpicked.

U.S. Pat. No. 3,648,447 (Burton) was issued on Mar. 14, 1972 for a harvestor for fruit from low plants. Burton has recognized the problem of obstacles on the ground, especially on wild blueberry fields. In order to solve these problems, Burton mounts his picking unit in a so-called "floating" manner with the aid of strong mechanical springs. Additionally, a ground engaging wheel supports the front end of the picking structure. However, the so-called ground engaging wheel of Burton does not provide a signal for the control of the floating movement. The main purpose of the ground engaging wheel is to maintain the space between the ground and the lowermost portion of the picking tines which travel around a picking drum and which are articulated in response to a cam track around the drum. The floating mounting of the picking unit according to Burton also has the drawback that the entire picking unit which may be, for example, ten feet wide, must be lifted off the ground even though a rock is only, for example, one foot in diameter. Thus, about nine feet of ground having a width corresponding to the width of the obstacle form an area not being picked even though there are no obstacles on this area.

OBJECTS OF THE INVENTION

In view of the foregoing it is the aim of the invention to achieve the following objects singly or in combination:

to construct a berry picker for an automatic berry picking operation in such a way that its picking head is optimally adaptable to the surface condition of the berry field, for example, of a wild blueberry field;

to arrange a plurality of picking units forming a picking head so that each picking unit is individually liftable automatically and independently of any other picking unit for clearing smaller obstacles individually, whereby all picking units not lifted can continue the berry picking to minimize any unpicked areas on the field;

to provide in addition to the individual lifting of any picking unit, a common lifting of the entire picking head for clearing larger obstacles on the ground, said common lifting providing an automatic raising in addition to the individual lifting of each picking unit and permitting a manual lifting by an operator through a control valve independently of the individual lifting;

to assure a gentle picking of the berries and a relatively gentle treatment of the bushes, thereby reducing, as much as possible, damage to the berries and the plants, even though the picking operation is automatic;

to avoid damage to the picked berries by a proper adjustment of the travel speed of the picking combs and of the berry picker as it travels along the field;

to separate the picked berries from any debris that may have been picked up along with the berries;

to continuously clean the picking combs individually; and to articulate picking combs in such a way that the picking drive chains can travel around a chain drive sprocket.

SUMMARY OF THE INVENTION

The invention achieves the foregoing objectives in a berry picking apparatus, wherein a berry picking head is carried by a mobile support. The picking head comprises a plurality of individual picking units arranged in at least one row, preferably in two rows, so that the picking units in one row are staggered relative to the picking units in the other row for providing a certain overlap between the picking units in one row with the picking units in the other row to thereby avoid unpicked strips on the berry field. The row or rows of picking units extend substantially perpendicularly to the travel direction of the mobile support. Each picking unit comprises a picking frame which forms chain guide tracks for a pair of endless chains riding along the guide tracks and carrying picking combs for picking berries. Each picking comb is secured with each end to a respective chain by pivot links which form a type of three point hitch to permit the combs to travel around the drive sprockets for the picking chains carrying the picking combs. The picking frames, or rather, each individual picking frame, is movably mounted to the mobile support so that power lifting devices provided individually for each picking frame, can lift the respective picking frame off the ground. At least one ground condition sensor, preferably two such sensors, are connected to each picking frame to produce an obstacle representing signal which is transmitted to the first power lifting means for lifting each picking frame individually out of the way of an obstacle. By lifting each picking unit individually, it is assured that the other picking units of a picking head which do not encounter an obstacle, can continue their picking operation next to an obstacle.

The means for mounting the picking head with its picking units to the mobile support preferably comprise a carriage type of frame which supports the plurality of picking units in a movable manner and which itself is supported by the mobile support in a floating manner, whereby the carriage normally holds the individual picking units in a picking position. Second power lifters, such as hydraulic piston devices, are operatively connected between the carriage and the mobile support for lifting the carriage. Further sensor means are arranged for sensing a situation requiring a lifting of the entire picking head in addition to the individual lifting of any picking unit. The second power lifters are responsive to the further sensors for performing the further lifting of the picking head, whereby the distance of lifting the entire picking head is added to the distance of lifting each individual picking unit. As a result, larger obstacles may be cleared, or the picking may continue even if the ground is uneven.

The most important advantage of the invention is seen in that the individual picking units can adapt themselves easily and efficiently not only to obstacles on the ground, but also to the contour of the ground which is very important in connection with the harvesting of wild blueberries from uncultivated fields.

BRIEF DESCRIPTION OF THE DRAWINGS

In order that the invention may be clearly understood, it will now be described, by way of example, with reference to the accompanying drawings, wherein:

FIG. 1 is an overall side view of the berry picker according to the invention, whereby details have been omitted so as not to obscure the illustration;

FIG. 2 is a plan view or side view of a ground sensor wheel with helical springs extending like spokes out of the wheel for providing a ground condition signal;

FIG. 3 shows another type of ground sensor wheel used for providing a ground condition signal;

FIG. 4 is a side view of the picking head on a slightly enlarged scale compared to FIG. 1;

FIG. 5 is a partial view of an endless chain drive for the picking combs of each picking unit;

FIG. 7 is a simplified top view in the direction of the arrow B in FIG. 4, but omitting the various hydraulic motors for the chain drives of the picking combs and omitting the hydraulic motors for driving the cleaning brushes, however, showing the staggering of the picking units in one bank of picking units relative to the picking units in the other bank of picking units and vice versa;

FIG. 8 is a side view of a picking frame provided for each picking unit;

Figure 6:
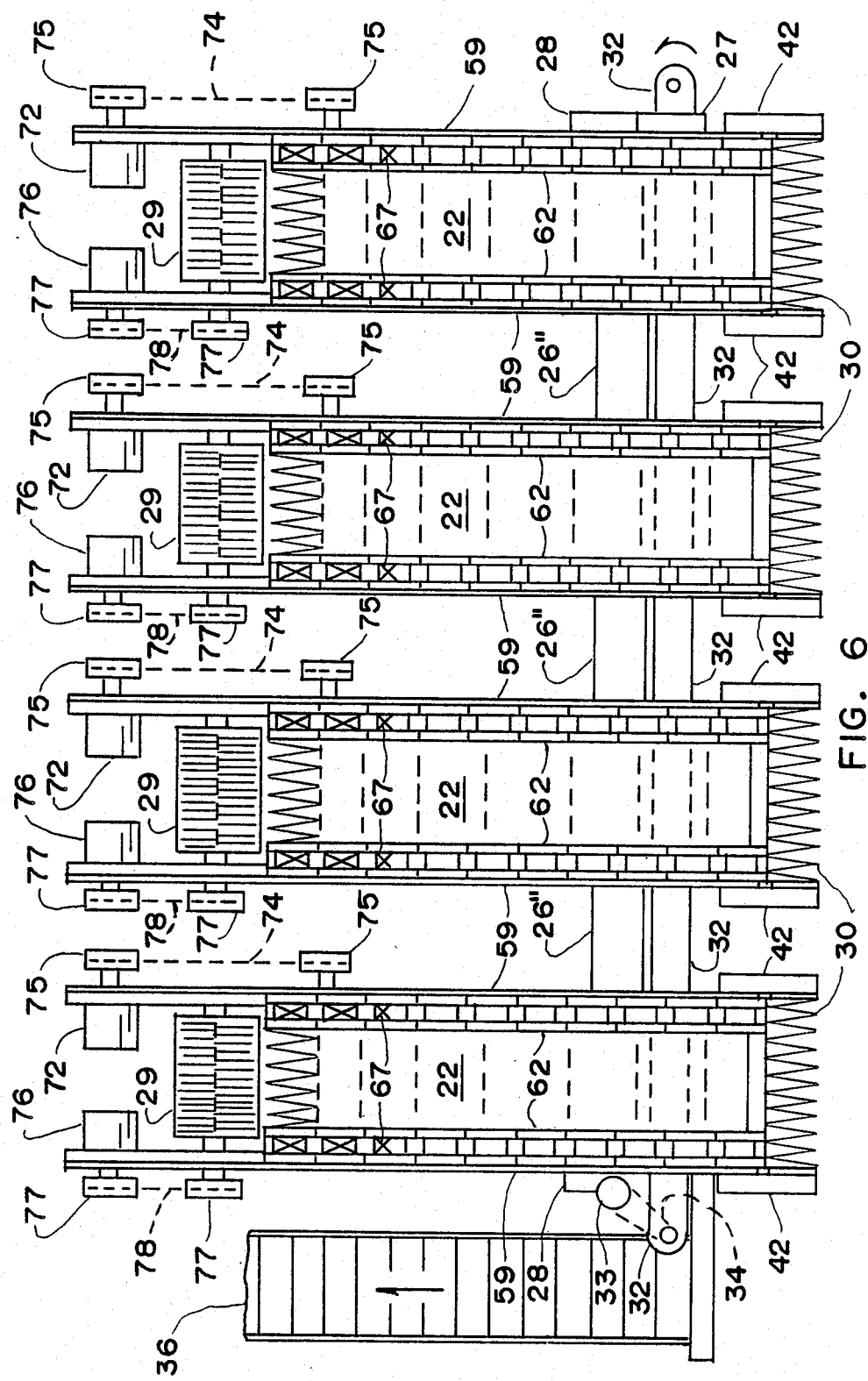
FIG. 6 is a simplified front view of a row of picking units as viewed in the direction of the arrow A in FIG. 4, whereby the second row or bank of picking units is not shown in FIG. 6.

DETAILED DESCRIPTION OF PREFERRED EXAMPLE EMBODIMENTS AND OF THE BEST MODE OF THE INVENTION

FIG. 1 shows a simplified side view of the berry picker 1 according to the invention travelling in the direction of the arrow 2. A picking head 3 is carried by a mobile support 4 forming a flat bed type truck. The mobile support 4 carries on its flat bed an engine 5 including a fuel tank 6. The engine 5 drives a hydraulic pressure pump 7 and an air blower 8. The pressure pump 7 provides the power source for all hydraulic drives and piston cylinder devices to be described. The various hydraulic connecting hoses are generally not shown since they are conventional and may comprise so-called quick couplers.

The mobile support or flat bed 4 is carried on a plurality of wheel sets 9 connected by conventional suspension systems 10 and pivots 11 to the support or flat bed 4. Each wheel of each wheel set 9 is driven by its own hydraulic motor 12 operating a respective chain drive 13. Each wheel set 9 is independently steerable by a hydraulic motor not shown. Each steering hydraulic motor is controlled by the operator through the control panel 14 mounted on a platform 15 carried by mounting means including rigid posts 16 rigidly secured to the front end of the support or flat bed 4. The posts 16 preferably extend at a slant relative to the horizontal flat bed 4 as best seen in FIG. 1. The slanting angle of the rigid posts 16 relative to a vertical on the flat bed 4 is preferably within the range of 25° to 50°. In the example embodiment there are three rigid posts 16 as best seen in FIG. 7. Each post is preferably braced by an upright member 17, one of which may form a ladder to reach the platform 15 carrying a seat 18 for the operator. The control panel 14 is equipped with a plurality of control handles 19 and a plurality of indicating devices 20 including various pressure gages. A plurality of hydraulic control hoses or conduits 21 lead to and from the control panel 14 to the various hydraulic motors. These control conduits 21 are only shown symbolically since they as such are conventional and may also comprise quick coupling devices.

The picking head 3 comprises a plurality of picking units 22 and 23. The picking units 22 form a leading bank or row 24 of picking units as best seen in FIG. 7. Similarly, the picking units 23 form a trailing bank or row 25 of picking units. As shown in FIG. 7, the picking units 23 of the row 25 are staggered relative to the picking units 22 of the row 24 so as to provide overlapping picking zones to make sure that the field of berries will be completely picked by avoiding unpicked strips between neighboring picking units. Although FIG. 7 shows only four picking units 22 in the leading row 24, and three picking units 23 in the trailing row 25, it is to be understood that the number of picking units in each bank may be selected as desired. Further, it is not absolutely necessary to employ the illustrated staggered arrangement because the picking units can be quite closely spaced, and for certain purposes, it may be sufficient to have but one row of picking units.

Referring further to FIG. 1, the picking units 22 and 23 are individually mounted in a movable manner by a carriage 26 forming part of the mounting means. The carriage 26 has a carriage section 27 for the leading bank 24 of picking units 22 and a carriage section 28 for the trailing bank 25 of picking units 23. Each picking unit 22, 23 has its own cleaning brush 29 and its own picking combs 30 driven by a pair of endless chains 62 riding along chain guide tracks to be described in more detail below. The picking comb 30 are driven so that the picking teeth 30' point downwardly when the picking combs are empty and upwardly when the picking combs are filled with picked berries. This direction of movement of the picking chains is indicated by the arrows 31 in FIGS. 3 and 4.

Referring further to FIGS. 1 and 4, each carriage section 27 and 28 has mounted therein a berry collecting conveyor 32 driven by its own hydraulic motor 33 and a respective chain drive 34. The conveyors 32 collect the picked berries 35 and supply these berries to a further collecting conveyor 36 which transports the picked berries and any debris that may have been collected to the top of a winnowing device 37 connected to the air blower 8 through a duct 38 for separating with blowing air the berries from the debris. The berries 35 are collected in boxes 39 on a table 40 from which the boxes 39 are manually removed by an operator. There is substantial stacking space for the boxes 39 behind the winnowing device 37 on the flat bed 4.

According to the invention each picking unit 22, 23 is equipped with at least one, preferably two, ground condition sensors 41 and/or 42 shown in more detail in FIGS. 2 and 3. The operation of these ground condition sensors 41, 42 will be described in more detail below with reference to FIGS. 4, 10, and 11.

FIG. 2 shows a ground condition sensor 41 having a hub 43 and a plurality of relatively stiff helical steel springs 44 secured to the hub 43 in the manner of spokes. The hub 43 has a mounting hole or bearing 45 for mounting the ground condition sensor or sensor wheel 41 on a stud 46 of a rocker lever 83 shown in FIGS. 10 and 11. The ground sensor 42 shown in FIG. 3 is of similar construction with a hub 43 and mounting hole or bearing 45. However, the flexibly yielding helical springs 44 have been replaced by a flexible disk 47 for example, of relatively hard rubber or the like. The function and operation of both ground sensors 41, 42 is the same for detecting obstacles on the ground and lifting the respective picking unit 22, 23 individually off the ground. The ground sensors 41, 42 do not support the picking units on the ground, since the picking units are individually and floatingly supported by first power lifting means in the form of piston cylinder devices 48 operatively inserted between the carriage 26 and the picking units 23 as well as between the carriage extension 26′ and the picking units 22 as best seen in FIG. 4. Each picking unit is equipped with its own piston cylinder device 48 for individually lifting and lowering the respective picking unit in response to the signal produced by the respective ground sensors 41 or 42. Thus, each individual picking unit can be lifted out of the way of an obstacle independently of any lifting of any other picking unit by the respective first power lifting piston cylinder device 48, whereby any other picking unit not lifted continues the picking of berries. This feature has the advantage that unpicked surface areas on the berry field, due to relatively small obstacles, are minimized. This feature in combination with the staggering of the picking units shown in FIG. 7, results in substantially completely avoiding unpicked areas even when the present picker has moved across a field only once.

Referring particularly to FIG. 4, the carriage 26 with its carriage extensions 26′, 26″ ard the carriage sections 27 and 28 form part of the mounting means for carrying the individual picking units 22, 23 in an individually movable manner and the entire picking head 3 also in a movable manner for moving the picking head and thus all the picking units in unison. For the latter purpose the entire carriage structure is supported in a floating manner by the rigid posts 16 which form guide rails for the carriage components 26, 26′, 27, 28 forming a frame structure secured to the upright posts or guide rails 16 by guide rollers 49. The carriage or frame structure 26, 26′, 27, 28 is suspended by steel cables 50 running over guide sheaves 51 and 52 as also shown in FIG. 7. The sheaves 51 are rotatably secured to the top ends of the posts or guide rails 16 which, incidentally, are horizontally interconnected by a cross beam means 53. Each other guide sheave 52 is secured to the free end of a piston rod 54 of a cylinder 55 rigidly secured to the respective post or guide rail 16. Preferably each of the three posts 16 carries one piston cylinder device 54, 55 forming second power lifting means operatively connected to the carriage or frame structure 26 through the steel cables 50 for lifting the carriage and thus the picking head 3 as a unit in response to large obstacles for which the individual lifting of the picking units 22, 23 is insufficient. For this additional lifting further sensor means 56, 57 are provided to which the piston cylinder device 54, 55 forming the second power lifting means are responsive. The details of the further sensing means 56, 57 will be described below with reference to FIG. 14.

The second power lifting means in the form of the piston cylinder devices 54, 55 may be responsive to the further sensor means 56, 57 for an automatic lifting of the carriage 26 or they may be responsive to a manual control by the operator who activates one of the control handles 19 to thereby supply through a respective control valve, the necessary hydraulic power to the cylinder 55. Thus, when the piston rod 54 moves downwardly, in response to an automatic or a manual control, the carriage 26 is lifted. When the piston rod 54 moves upwardly into the cylinder 55, the carriage 26 is lowered. This manual or automatic lifting or lowering of the carriage 26 is indicated in FIG. 4 by the double arrow 58. Thus, the carriage 26 may be lifted by the operator independently of the second or further sensor means 56, 57. Such a lifting, whether manual or automatic, lifts the entire picking head 3 and thus all picking units 22, 23 in unison.

Figure 9:
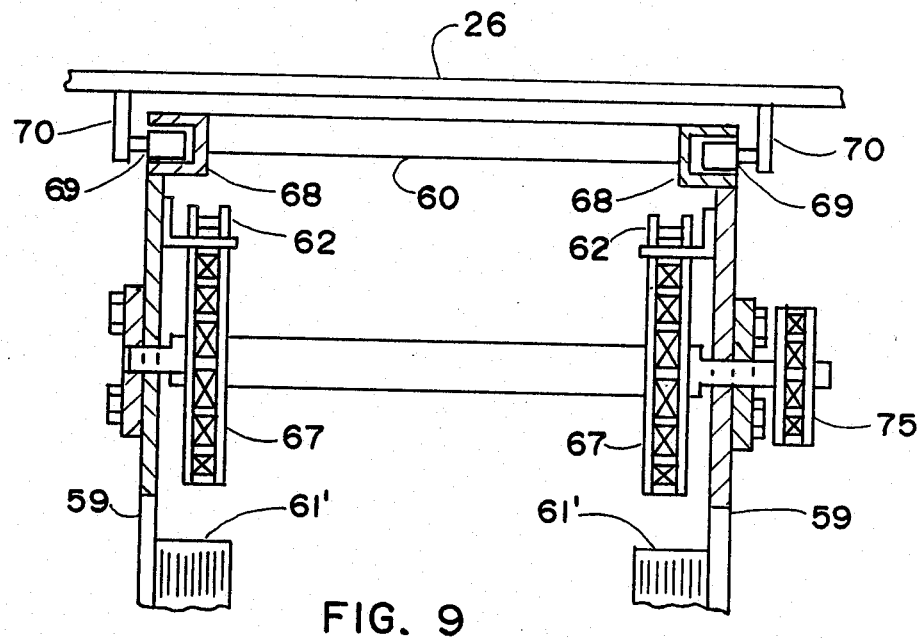
FIG. 9 is a sectional view along section line 9—9 in FIG. 8 to show the chain drive for the picking combs, but omitting the combs.
Figure 10:
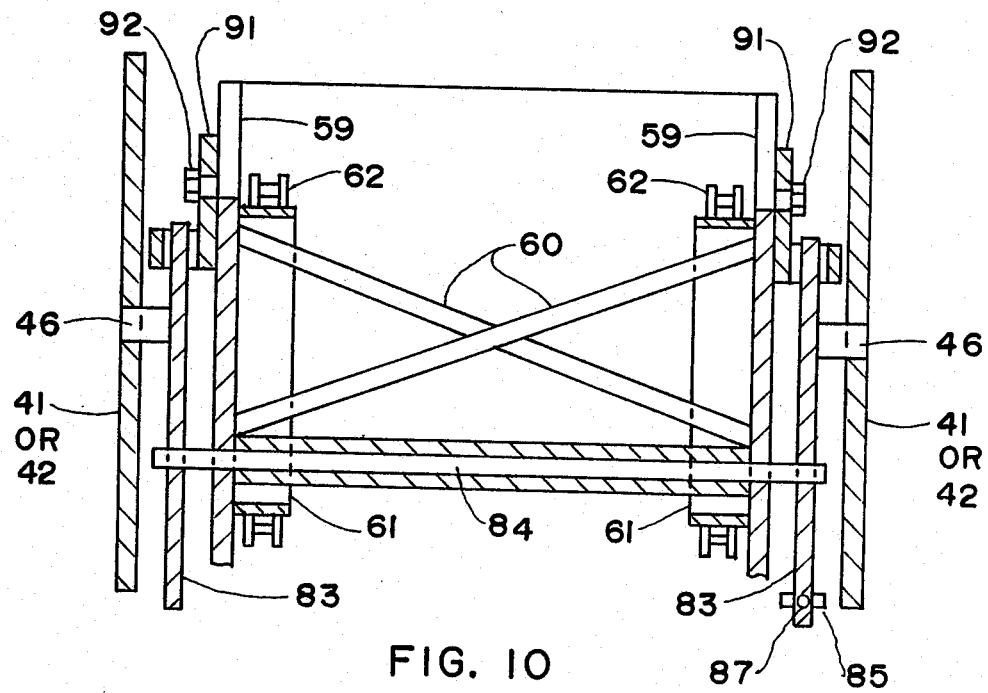
FIG. 10 is a sectional view along section line 10—10 in FIG. 8 for illustrating the ground sensing device and the lower chain guide sections.

Referring to FIGS. 4, 5, 6, 7, and 8, the individual picking units 22, 23 will now be described. Since all picking units are of the same structure, it will be sufficient to describe only one picking unit. Each picking unit 22, 23 comprises a picking frame 59 made, for example, of sheet metal and including two side frame members interconnected by cross braces 60, for example shown in FIGS. 9 and 10. Each side frame member has attached thereto a chain guide track 61 on the inwardly facing side thereof. These chain guide tracks 61 form part of the respective picking frame. A pair of endless picking drive chains 62 rides along these chain guide tracks as best seen in FIGS. 6, 9, and 10. These drive chains 62 are spaced from each other in accordance with the spacing between the guide tracks. Such spacing could be approximately 10 to 18 inches. However, other spacings may be practical.

Figure 15:
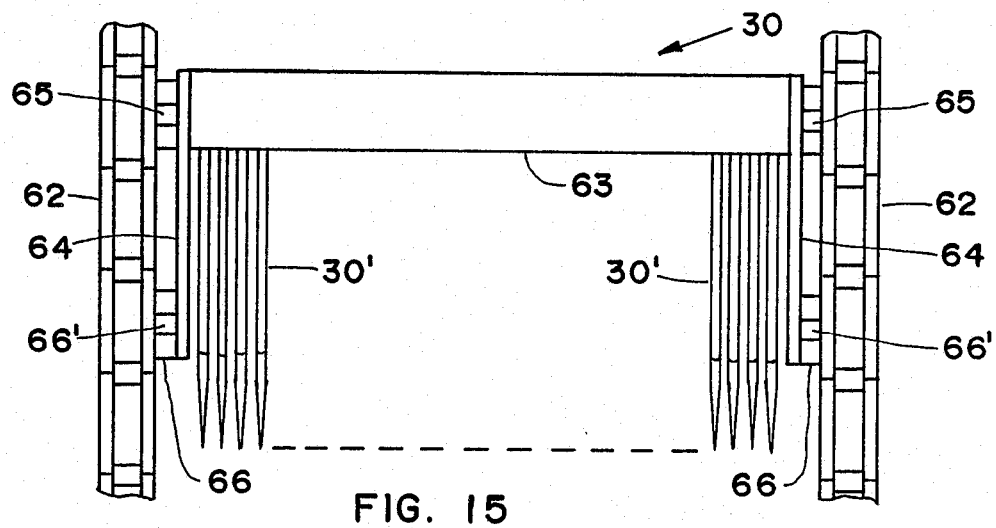
FIG. 15 is a front view of a picking comb attached to two parallel drive chains.

The endless chains 62 carry the above mentioned picking combs 30 as shown in FIGS. 5 and 15. Each picking comb 30 is secured at one end to one of the picking chains of a pair and at the other to the other chain of a pair. Referring specifically to FIG. 5, and to FIG. 15, each picking comb 30 comprises a plurality of picking teeth 30′ secured, e.g. by welding, to a piece of sectional steel forming a bucket 63 for holding berries 35, and two side walls 64. A first pivot member 65 connects a rear end of the side wall 64 to a link in the chain 62. A second double pivot member 66 connects a relatively forward end of the side wall 64 to a further link of the chain 62. The double pivot link 66 of each comb forms two pivot or journal connections 66′ and 66″ which together with the pivot or journal connection 65 provide a three pivot type connection for each end of a comb 30 to the respective chain 62. This feature is advantageous because it permits the combs to travel around the drive sprocket wheels 67. Thus, the connecting link 66 of the upper comb in FIG. 5 which is just travelling through the highest point around the sprocket wheel 67, is more inclined than the connecting link 66 of the next lower comb which has already moved past the sprocket wheel 67. This feature is further advantageous because it helps keeping picked berries 35 in the bucket 63 of the combs 30 until the berries may be dropped into the respective conveyors 32. Due to the three pivot hitch 65, 66, 66', 66", the dropping of berries begins only when the respective bucket 63 reaches the highest point on top of the sprocket wheels 67. The dropping of the berries 35 is preferably completed before the respective picking comb 30 reaches guide portions 61' forming a ramp in the chain guide tracks 61.

As shown in FIG. 5, each chain guide track 61 has a chain guide track portion or ramp 61' which guides the respective chain 62 somewhat away from the sprocket wheel 67, thereby also facilitating the dropping of the berries onto the conveyors 32.

Figure 12:
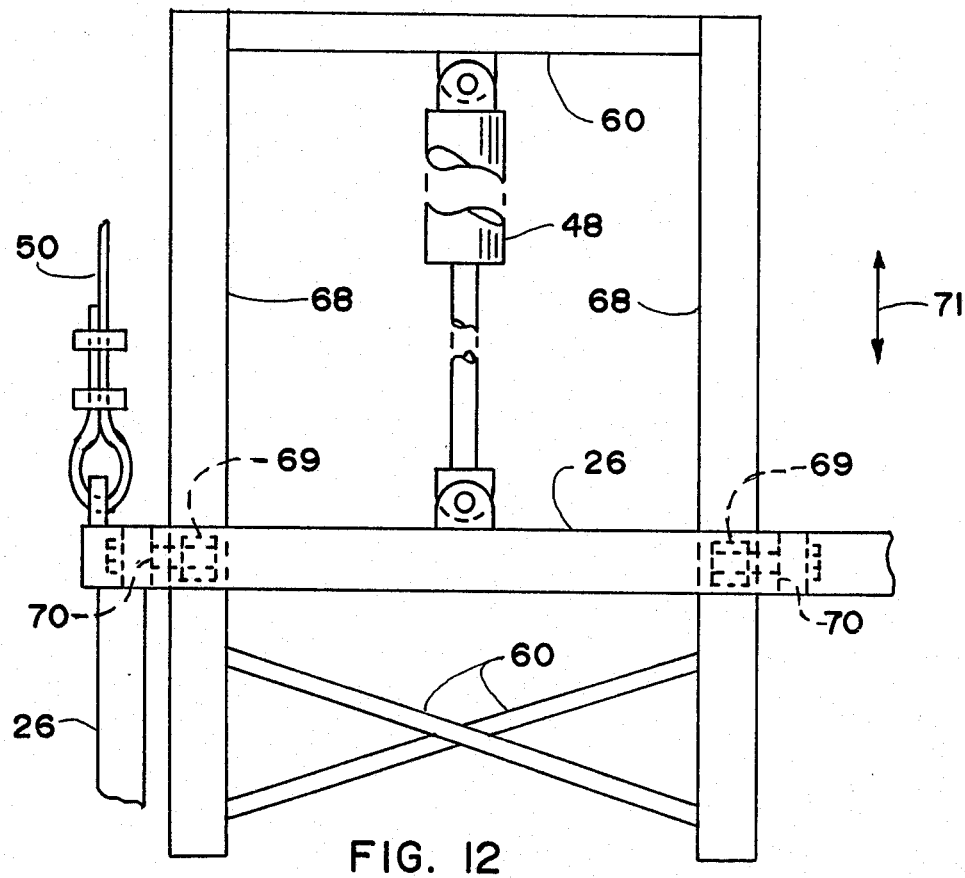
FIG. 12 is a view against the back of the guide bars of an individual picking frame for illustrating first power lifting means responsive to the ground sensor means.

As shown in FIG. 8, each picking unit 22, 23 has also, as part of its picking frame, a pair of guide bars 68 interconnected by the above mentioned cross braces 60 and cooperating with guide rollers 69 connected by brackets 70 to the carriage or frame structure 26, please see in this connection also FIGS. 9 and 12. The above mentioned first power lifting means in the form of piston cylinders 48 are operatively arranged between the respective cross brace 60 and the frame or carriage structure 26 for raising and lowering each individual picking unit as indicated by the double arrows 71 in FIGS. 4 and 12.

Referring to FIGS. 4, 6, and 8, each picking unit 22 or 23 comprises its own hydraulic drive motor 72 mounted to the picking frame 59 by a bracket 73. For driving the respective sprocket 67 through a power transmission train including, for example, a drive chain 74 and further sprockets 75, one of which is secured to the drive shaft of the hydraulic motor 72 and the other of which is secured to the axle on which the drive sprockets 67 are also mounted as best seen in FIG. 6. FIG. 6 also shows hydraulic drive motors 76 individually provided for driving each cleaning brush 29 of each picking unit. The drive power of the hydraulic motor 76 is transmitted through sprockets 77 and drive chains 78. It may be desirable to adjust the position of each brush 29 relative to the picking combs 30. The means for such position adjustment are well known and therefore merely indicated by a double arrow 79 in FIG. 8.

Referring to FIGS. 8, 9, and 10, each endless chain guide track 61 comprises a lower approximately semicircular section 80 forming a lower turnaround, an upper section including the drive sprockets 67 forming an upper turnaround, two elongated straight guide track sections 81 and 82 between the lower and upper turnaround sections and said ramp portion 61' just downstream of the drive sprockets 67 as viewed in the direction of chain movement indicated by the arrows 31 in FIG. 4. The ramp portions 61' guide the picking comb drive chains 62 somewhat away from a path that would otherwise be determined by the sprocket wheel 67, whereby the picking combs are also lifted for facilitating the berry removal from the picking combs by gravity.

Referring to FIGS. 4 and 6, the above mentioned first endless berry conveyors 32 ar mounted to the mounting means which are formed by the components of the carriage 26, 27, 28, 26', and 26". Thus, the first conveyors 32 are lifted together with the carriage means by the operation of the second power lifting means in the form of the piston cylinders 54, 55. The conveyors 32 are located between the elongated guide track sections 81 and 82, as shown in FIG. 8, at such an elevation that they do not interfere with the individual lifting of each picking unit. All first berry conveyors 32 extend substantially perpendicularly to the travel direction of the picker and are so arranged that their discharge ends shown at the left-hand side of FIG. 7, are located above the second collecting conveyor 36 which thus can receive the berries when they drop from the first conveyor 32 by gravity onto the second conveyor 36, which, incidentally is driven by a hydraulic motor 36' as shown in FIG. 1.

Figure 11:
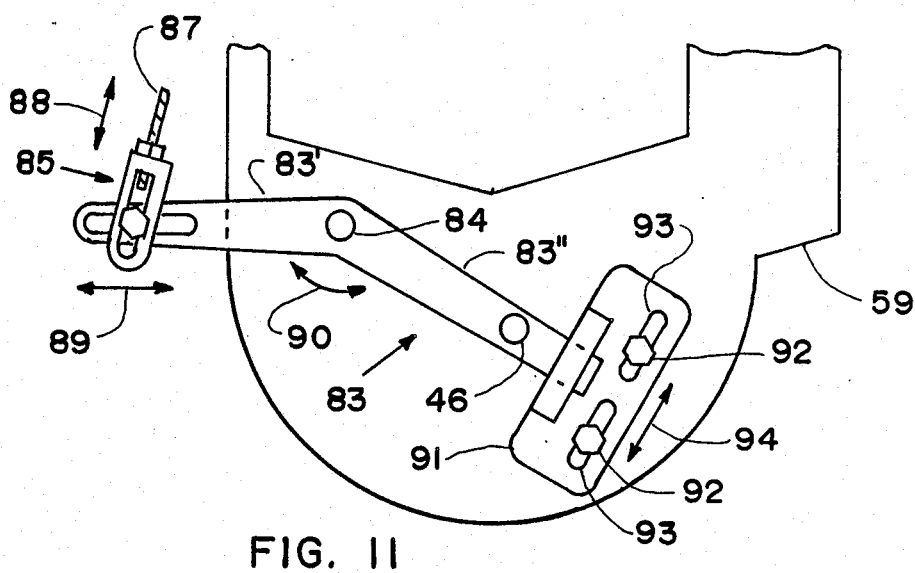
FIG. 11 is an enlarged side view of the ground sensing device, but omitting the ground sensing wheel.

Referring to FIGS. 8, 10, and 11, the ground condition sensor means will now be described. These ground condition sensor means comprise means for floatingly mounting the ground engaging wheel 41 or 42, including a see-sawing rocker lever 83 for each ground engaging wheel 41 or 42. The rocker lever 83 is mounted on a shaft 84 which is operatively held in the picking frame 59 as best seen in FIG. 10. The shaft 84 may be rigidly held in the picking frame 59 against rotation, in which case the rocker lever 83 is journalled to the free end of the shaft 84. On the other hand, the shaft 84 may be journalled in the picking frame 59, in which case the rocker lever 83 is rigidly secured to the free end of the shaft 84. The rocker lever 83 has two arms 83' and 83". Mechanical signal transmitting means 85 are adjustably connected to the lever arm 83' for transmitting the motion of the ground sensor wheel 41 or 42 as a ground condition signal to respective control valves 86 which control the first lifting piston cylinder devices 48 for individually lifting the picking units 22 or 23. The signal transmitting means 85 comprise mechanical linkage members 87 connected for operating the respective valves 86. The connection of the link 87 to the arm 83' is conventionally adjustable as indicated by the double arrow 88 for a substantially vertical adjustment and by the double arrow 89 for a substantially horizontal adjustment. The arm 83" carries the journal stud 46 for mounting the ground sensor wheel to the arm 83". The journalling movement indicated by the arrow 90 of the rocker lever 83 about the horizontal axis defined by the shaft 84 is limited by a bracket 91, the position of which is adjustable by screws 92 and longitudinal holes 93 as indicated by the double arrow 94. A similar adjustment of the limiting bracket 91 may also be achieved by providing a row of mounting holes 95 in the sidewall of the picking frame 59 as shown in FIG. 8. The purpose of the adjustments indicated by the arrows 88, 89 and 94 is to precisely control the operation of the control valves 86 for the piston cylinder devices 48. It is sufficient to transmit the ground condition representing signal through one mechanical signal transmitting means 85 even though two ground condition wheels are employed because the pivoting of one rocker lever 83 also causes the pivoting of the other rocker lever 83 and vice versa.

Figure 14:
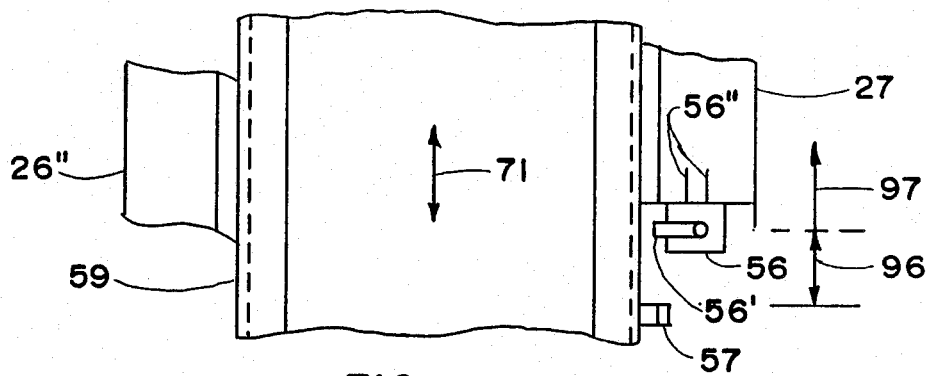
FIG. 14 shows the arrangement of a further sensor for each picking unit for sensing that a maximum lifting of any individual picking unit is insufficient for clearing a large obstacle on the ground.

Referring to FIG. 14, the above mentioned further sensor means 56 may comprise an electrical switch, for example, a so-called microswitch having an operating member 56'. The switch 56 is mounted to a carriage section 27 in such a position that its operating member 56' will be activated when it is contacted by a trip dog 57 connected to the picking frame 59 when the latter reaches its maximum upper limit indicated by the arrow 96 in FIG. 14. As long as the up and down movement of the picking frame 59 as indicated by the double arrow 71 remains less than the maximum permitted upward travel, the further sensor 56 will not be tripped. However, when a larger obstacle is encountered, the piston cylinder device 48 will lift its picking frame 59 to an extent causing the operation of the sensing switch 56 which thus produces an electrical signal at its terminals 56". This electrical signal is then utilized to operate a magnetic valve for automatically lifting the entire carriage 26 by activating the piston cylinder device 54, 55 as described above. This additional lifting is indicated by the arrow 97, in FIG. 14. Thus, it is clear that the individual lifting as indicated by the arrow 96 and the lifting of the entire picking head as indicated by the arrow 97 take place in series so to speak. However, the operator may manually override the further sensor 56 and start lifting the entire picking head 3 even before any one of the individual picking frames 59 reaches its upper excursion limit. These features provide an effective protection of each picking-unit individually and of the entire picking head against damage by smaller and larger obstacles on a wild berry field.

Figure 13:
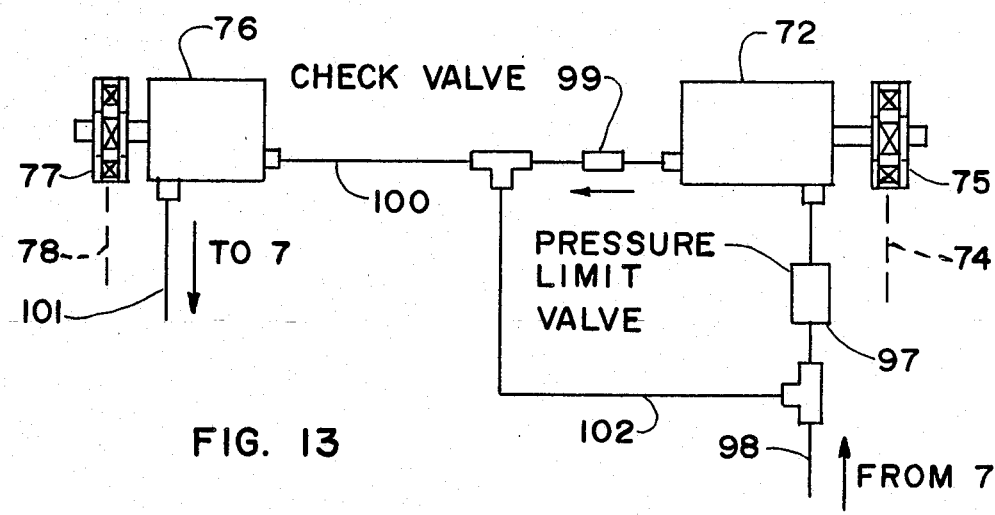
FIG. 13 is a hydraulic circuit diagram for the hydraulic motor of any one of the picking chain drives and for the hydraulic motor of any one of the cleaning brush drives.

Referring to FIG. 13, it is preferable that the hydraulic motors 72 for driving the chain sprockets 67 are protected against an overload. For this purpose a pressure limit valve 97 is inserted into the hydraulic power supply line 98 coming from the hydraulic pressure pump 7 or rather from the control panel 14. The pressure limit valve 97 stops the operation of the hydraulic drive motor 72 when a predetermined pressure value is exceeded. The discharge port of the hydraulic motor 72 is connected through a check valve 99 and a hydraulic conduit 100 to the hydraulic brush drive motor 76, the discharge port of which is connected back to the pump 7 through a conduit 101. A bypass conduit 102 bypasses the motor 72 and the valves 97 and 99 for directly connecting the inlet port of the motor 76 to the hydraulic power line 98.

It may be practical to use instead of two parallel chain drives for the picking combs a single endless drive transmission for the picking combs, for example secured to the center of the picking combs. In that instance, the picking combs would also be permitted to perform the required pivoting motion with the aid of a three point hitch type connection as described above. Further, in the shown embodiment the guide rail 16 is secured to the flat bed 4 while the guide rollers 49 are secured to the carriage by the brackets 70. A mechanical reversal of this arrangement is possible by connecting the guide rollers 49 to the mobile support means and securing the guide rails 16 to the carriage 26. Similarly, rather than providing the guide bars 68 as part of the picking frames 59 and securing the guide rollers to the carriage means, the reversal is also possible, whereby the guide bars 68 would form part of the carriage means while the guide rollers 69 are secured to the picking frames.

Although the invention has been described with reference to specific example embodiments, it will be appreciated that it is intended to cover all modifications and equivalents within the scope of the appended claims.

What we claim is:

1. A berry picking apparatus, comprising picking head means for picking berries, mobile support means for operatively carrying said picking head means, said mobile support means being movable in a travel direction, said picking head means comprising a plurality of individual picking units arranged in a row extending substantially perpendicularly to said travel direction, each picking unit comprising a picking frame, two spaced chain guide tracks forming part of said picking frame, a pair of endless chains riding along said chain guide tracks, a plurality of picking combs each including a plurality of picking teeth for picking berries, pivot means individually securing each picking comb with its ends to said endless chains so that said picking combs ride along with said pair of endless chains, chain drive means including drive sprocket means arranged in each picking frame for driving said endless chains carrying said picking combs, mounting means for movably and individually mounting each picking frame to said mobile support means, first power lifting means arranged between each picking frame and said mounting means for individually lifting each of said picking frames, ground condition sensor means operatively and separately connected to each picking frame of each picking unit for providing an obstacle representing signal, said ground condition sensor means comprising for each picking unit at least one ground engaging wheel, see-sawing lever means for securing the respective ground engaging wheel to the corresponding picking frame, said see-sawing lever means having two ends, first journal means pivotally securing said see-sawing lever means to the respective picking frame intermediate said ends to form two rocker lever arms, second journal means journalling said ground engaging wheel to one of said lever arms, and signal transmitting means pivoted to the other of said lever arms and connected to said first power lifting means for transmitting said obstacle representing signal to said first power lifting means for activating said first power lifting means and individually lifting the respective picking unit out of the way of an obstacle independently of any lifting of any other picking unit by its respective first power lifting means for permitting any other not lifted picking unit to continue picking berries.

2. The berry picking apparatus of claim 1, wherein said picking units are arranged in two groups of picking units so that the picking units of one group are located in a staggered relationship to the picking units of the other group and vice versa, whereby spacings between picking units of one group are covered by the picking units of the other group and vice versa for a uniform picking of berries along a picking path travelled by said berry picking apparatus.

3. The berry picking apparatus of claim 1, wherein said mounting means comprise carriage means for carrying said picking head means on said mobile support means in a floating manner normally holding said individual picking units in a picking position, second power lifting means operatively connected to said carriage means and to said mobile support means for lifting said carriage means, further sensor means arranged for sensing a situation requiring a further lifting of said picking head means out of said picking position in addition to any individual lifting of any one of said picking units, said second power lifting means being responsive to said further sensor means for performing said further lifting of said picking head means in said situation requiring said further lifting.

4. The berry picking apparatus of claim 3, further comprising manual operating control means connected to said second power lifting means for lifting said carriage means independently of said further sensor means.

5. The berry picking apparatus of claim 3, wherein said further sensor means comprise electrical sensors for sensing severe ground conditions, which exceed a sensing ability of said first mentioned ground condition sensor means, for protecting said picking head means.

6. The berry picking apparatus of claim 3, wherein said mounting means comprise substantially upright guide rail means for guiding said carriage means and guide bar means arranged for individually guiding each of said picking frames, said apparatus further comprising first guide roller means arranged for permitting a first relative movement between said picking frames and said carriage means in response to an operation of said first power lifting means, and second guide roller means arranged for permitting a second relative movement between said carriage means and said mobile support means in response to an operation of said second power lifting means.

7. The berry picking apparatus of claim 1, wherein said ground condition sensor means further comprise means for limiting a rocking movement of said see-sawing lever means, said first power lifting means comprising piston cylinder means arranged between each of said picking frames and said mounting means for individually lifting and lowering each of said picking frames relative to said mounting means in response to a rocking see-sawing movement of the respective ground engaging wheel, and power source means for operating said piston cylinder means, and wherein said signal transmitting means comprise a mechanical link pivoted at one end to said other lever arm and connected with its other end to said power source means for operating said piston cylinder means when said ground engaging wheel is sensing an obstacle on the ground.

8. The berry picking apparatus of claim 1, wherein said ground engaging wheel comprises a plurality of relatively stiff helical springs arranged as spokes for engaging the ground.

9. The berry picking apparatus of claim 1, wherein said ground engaging wheel is a disk of a relatively stiff, yet somewhat flexible material, such as hard rubber.

10. The berry picking apparatus of claim 1, wherein said chain drive means comprise hydraulic motors for driving said sprocket means and pressure relief bypass means for stopping said hydraulic motors for protecting said individual picking units.

11. The berry picking apparatus of claim 1, wherein said chain guide tracks comprise a lower approximately semicircular section, an upper section formed by said drive sprocket means, two elongated substantially straight guide track sections between said lower and upper sections, and a ramp section just downstream of said drive sprocket means as viewed in a chain movement direction, said ramp section causing said endless chains to lift said picking combs for facilitating berry removal from said picking combs by gravity.

12. The berry picking apparatus of claim 11, further comprising first endless berry conveyor means operatively mounted to said mounting means and passing through between said elongated guide track sections of all individual picking units, whereby said first endless berry conveyor means extend substantially perpendicularly to said travel direction, and second endless berry conveyor means arranged to receive berries from said first endless berry conveyor means for transporting berries to a collection container on said mobile support means, said second endless berry conveyor means having a section extending below of and substantially perpendicularly to an end portion of said first endless berry conveyor means for dropping berries from said first conveyor means onto said second conveyor means.

13. The berry picking apparatus of claim 12, further comprising fan means arranged for separating leaves and debris from picked berries prior to depositing berries in said collection container.

14. The berry picking apparatus of claim 6, wherein said guide rail means are secured to said mobile support means, wherein said guide bar means are secured to said picking frames, wherein said first guide roller means are secured to said carriage means for cooperation with said guide bar means to permit said first relative movement individually between said picking frames and said carriage means, wherein said guide rail means are secured to said mobile support means, and wherein said second guide roller means are secured to said carriage means for cooperation with said guide rail means to permit said second relative movement.

15. The berry picking apparatus of claim 1, wherein each of said plurality of said picking combs comprises a bucket section, said plurality of teeth being secured to said bucket section, and side walls connected to ends of said bucket section, said pivot means comprising a first pivot member connecting said side walls to said endless chains near said bucket section, a pivot link, a second pivot member connecting one end of said pivot link to said side walls at a point remote from said bucket section, and a third pivot member connecting another end of said pivot link to said endless chains for providing a three pivot type of connection between each of said side walls and said endless chains.

16. The berry picking apparatus of claim 15, wherein said pivot link is so dimensioned that said bucket section can assume different angular positions as the picking combs travel along said chain guide tracks, whereby the bucket section holds berries picked by said teeth when the combs travel through a berry bush, and whereby the bucket section discharges berries when the endless chains travel through a point of turn-around on said drive sprocket means.

17. A berry picking apparatus, comprising picking head means for picking berries, mobile support means for operatively carrying said picking head means, said mobile support means being movable in a travel direction, said picking head means comprising a plurality of individual picking units arranged in a row extending substantially perpendicularly to said travel direction, each picking unit comprising a picking frame, endless guide track means forming part of said picking frame, endless drive transmission means riding along said guide track means, a plurality of picking combs each including a plurality of picking teeth for picking berries, pivot means individually securing each picking comb to the respective endless drive transmission means so that said picking combs ride along with said endless drive transmission means, drive means arranged for driving said endless drive transmission means with said picking combs to perform a picking operation, mounting means for movably mounting said picking head means to said mobile support means, power lifting means arrange between each picking frame and said mounting means for individually lifting each of said picking frames independently of any other of said picking frames, ground condition sensor means operatively connected to each picking frame for providing an obstacle representing signal, and signal transmitting means operatively arranged between said ground condition sensor means and said power lifting means for transmitting said obstacle representing signal to said power lifting means for activating said power lifting means and individually lifting the respective picking unit out of the way of an obstacle while permitting any other not lifted picking unit to continue picking berries, and wherein said endless guide track means comprise a lower turnaround section, an upper turnaround section and two elongated substantially straight guide track sections between said lower and upper turnaround sections, and a ramp section downstream of said upper turnaround section as viewed in a movement direction of said endless drive transmission means, said ramp section causing said endless drive transmission means to lift said picking combs for facilitating berry removal from said picking combs by gravity.

18. The berry picking apparatus of claim 17, comprising further sensing means for providing a lifting signal, and automatic control means responsive to said lifting signal, further power lifting means connected to said further sensing means for automatically lifting said mounting means when the individual lifting of any of said picking units is insufficient for clearing an obstacle on the ground on which said berry picking apparatus is travelling, whereby said picking head means are lifted as a unit.

19. The berry picking apparatus of claim 17, wherein said pivot means for securing each picking comb to the respective endless drive transmission means comprise a connection with three pivot points for permitting a pivoting motion of each picking comb relative to said endless drive transmission means.

20. A berry picking apparatus, comprising picking head means for picking berries, mobile support means for operatively carrying said picking head means, said mobile support means being movable in a travel direction, said picking head means comprising a plurality of individual picking units arranged in at least one row of picking units extending substantially perpendicularly to said travel direction, each picking unit comprising a picking frame, endless guide track means forming part of said picking frame, endless drive transmission means riding along said guide track means, picking combs for picking berries, pivot means for securing each picking comb to the respective endless drive transmission means so that said picking combs ride along with said endless drive transmission means, and drive means arranged for driving said endless drive transmission means with said picking combs to perform a picking operation, wherein said picking combs comprise a bucket section, a plurality of teeth secured to said bucket section, and side walls connected to ends of said bucket section, said pivot means comprising a first pivot member connecting said side walls to said endless drive transmission means near said bucket section, a pivot link, a second pivot member connecting one end of said pivot link to said side walls at a point remote from said bucket section, and a third pivot member connecting another end of said pivot link to said endless drive transmission means for providing a three pivot type connection between said side walls and said endless drive transmission means.

* * * * *